Nov. 9, 1937.    W. L. KAUFFMAN, 2D    2,098,920
WRINGER
Filed Oct. 16, 1935

Walter L. Kauffman II
INVENTOR.

BY
ATTORNEYS.

Patented Nov. 9, 1937

2,098,920

UNITED STATES PATENT OFFICE 2,098,920

WRINGER

Walter L. Kauffman II, Erie, Pa., assignor to Lovell Manufacturing Company, Erie, Pa., a corporation of Pennsylvania Application October 16, 1935, Serial No. 45,281

7 Claims. (Cl. 68—32)

Wringers as now produced are largely formed from sheet metal, or metal having thin walls. It is common to make the top bar of the wringer detachable from the side walls both for the purpose of assembly and of providing a safety release for relieving pressure on the rolls. The pressure to which the top bar is subjected in exerting pressure on the rolls requires a rugged securing means between the top bar and the side stiles and this is preferably formed of sufficient strength in the metal now commonly used. The present invention is designed to improve the interlocking attachment between the top bar and a wringer stile.

Features and details of the invention will appear from the specification and claims.

Figure 1:
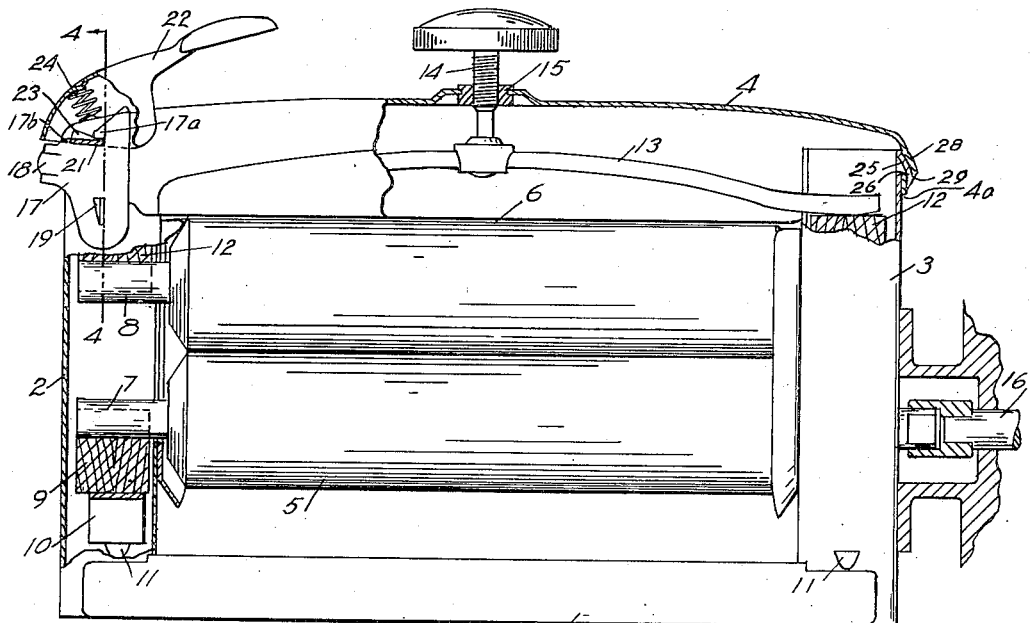

A preferred embodiment of the invention is illustrated in the accompanying drawing as follows:

Fig. 1 shows a front elevation of the wringer partly in section.

Figure 2:
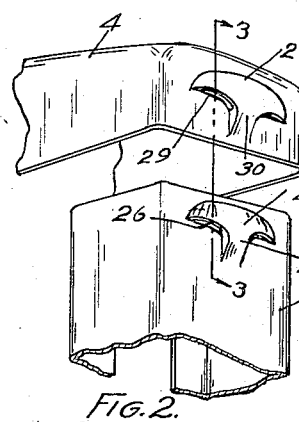

Fig. 2 an enlarged perspective of the interlocking features connecting the top bar and a stile.

Figure 3:
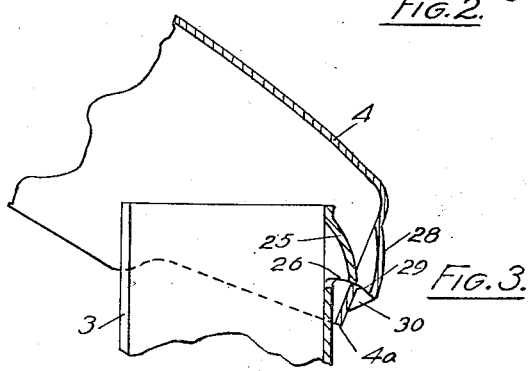

Fig. 3 an enlarged section on the line 3—3 in Fig. 2 with the top bar tilted toward disengaging position.

Figure 4:
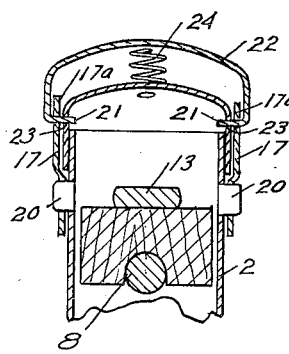

Fig. 4 a section on the line 4—4 in Fig. 1.

Figure 5:
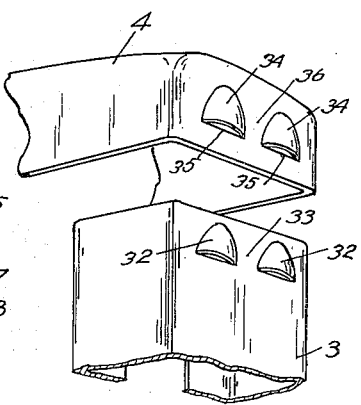

Fig. 5 a perspective view of a modification of the interlocking device.

1 marks the base, 2 and 3 the stiles of the wringer frame, 4 the top bar, 5 the lower roll, 6 the upper roll, 7 a shaft of the lower roll, 8 a shaft of the upper roll, 9 bearings for the lower shaft, 10 mountings for the bearings, these mountings resting on shoulder 7 within the walls of the side stiles, it being understood that the side stiles are of box formation and formed of thin metal. 12 marks the bearings for the upper shaft. The spring 13 rests on the upper bearing and is tensioned by means of a screw 14 operating from a nut 15 in the top bar. The lower shaft is driven by shaft 16 getting its power from any convenient source. These features may be or are of common construction.

The top bar is designed to be released from one end which permits the top bar to tilt and to effect a disengaging of the interlocking members at the opposite end. Any convenient releasing device may be used for one end of the top bar. As shown it comprises the latch 17 which has its side plates 17 joined by a cross plate 18. The plates 17 have triangularly shaped openings 19 into which the pivot projections 20 struck up from the side of the side stiles extend, thus forming a pivotal connection between the latch and the side stiles. The plates 17 are provided with hooks 17a which engage trunnions 21. The trunnions 21 extend inwardly from the sides of the operating lever 22 passing under the hooks 17a and into triangularly shaped openings 23 in the side walls of the top bar. A spring 24 yieldingly holds the lever in locked position. In operation when the lever is depressed, it tilts the trunnion 21 and the hook 21a slides off the trunnion releasing the top. In order to avoid accidental releasing of the top bar, the plates 17 are provided with stop shoulders 17b which prevent the hooks from disengaging from the trunnions 21 except when the trunnions 21 are tilted so as to bring their outer edges above the shoulders 17b.

The outer face of the stile has shoulders formed on it by a stabbing 25. The under edges of this stabbing forms the shoulder 26 and the slit of the stabbing is interrupted at the center forming a bridge portion 27.

The top bar is of channel formation and has downwardly extending ends which overlap the outer faces of the stile. This downwardly extending end is provided with a stabbing 28 quite similar in structure to the stabbing 25. The slits formed by the stabbing provide shoulders 29 which are adapted to engage the shoulders 26 of the stabbing 25. The slit of the stabbing 28 is interrupted by a bridge portion 30.

As commonly made, these shoulders formed by stabbings are formed with a single slit and with the very light metal which is commonly used, the shoulders are apt to yield and become imperfect in use. By bridging the slit the strength of the shoulders is very materially increased, and therefore permits of the use of lighter metal.

In order to avoid any tendency for disengagement of the interlocking shoulders, I prefer to form the slits, so that the edge 29 engaging the shoulder 26 extends slightly upwardly under the edge 26 so as to form a more definite interlock to prevent the edging out of the edge 29 from under the edge 26. Where this overhanging of the lip is provided for this purpose, there is a tendency to obstruct the upward movement of the free end of the top bar during disengagement, as the bottom edge 4a of the overlapping end of the top bar fulcrums on the side stile to force the disengagement of the shoulder. This is avoided in the present structure by shaping the edges 26 and 27 to perform a camming action. The initial engagement between these edges is between the outer ends of the slits the vertical overlapping of the lips being toward the center, and, as the top is tilted, the engagement progressively passes toward the center, thus through this camming action incident to the progressive movement of one edge on the other the overlapped central portion of the edge 29 if brought into register with the edge of the lip 26 and the lip 29 passes from under the overhanging portion of the lip 26.

In the modification shown in Fig. 5 I have shown pairs of stabbings 32 separated by the bridge piece 33, these stabbings being adapted to engage shoulders 35 formed by stabbings 34 in the top, the stabbings 34 being separated by bridge piece 36. In this structure I have not shown the camming action and have definitely separated the stabbing into two separate units.

What I claim as new is:—

1. In a wringer, the combination of a frame comprising hollow metal stiles, one of the stiles at least having a dual stabbing with a bridge portion between the stabbings, said stabbings forming a shoulder each side of the bridge; and a top bar having a downwardly extending end wall overlapping the outer face of the stile and having an interlocking means engaging the shoulders.

2. In a wringer, the combination of a frame comprising hollow metal stiles, one of the stiles at least having shoulders adjacent to its upper end; and a top bar having a downwardly extending end wall with dual stabbings with a bridge portion between forming shoulders each side of the bridge adapted to engage with the shoulders of the stile.

3. In a wringer, the combination of a frame comprising hollow metal stiles, one of the stiles at least having a dual stabbing with a bridge portion between the stabbings, said stabbings forming a shoulder each side of the bridge; and a top bar having a downwardly extending end wall with dual stabbings with a bridge portion between forming shoulders each side of the bridge adapted to engage with the shoulders of the stile.

4. In a wringer, the combination of a frame comprising hollow metal stiles, one of the stiles at least having a stabbing providing an outwardly projecting lip, the lower edge of which forms a shoulder; and a top bar having a downwardly extending end wall having an outwardly extending stabbing forming a lip and a shoulder on the lower edge of the slit formed by the stabbing, said lip on the stile and shoulder below the slit on the top bar being related to provide a lapping of the lip vertically over the shoulder on the top bar.

5. In a wringer, the combination of a frame comprising hollow metal stiles, one of the stiles at least having a stabbing providing an outwardly projecting lip, the lower edge of which forms a shoulder; and a top bar having a downwardly extending end wall having an outwardly extending stabbing forming a lip and a shoulder on the lower edge of the slit formed by the stabbing, said lip on the stile and shoulder below the slit on the top bar being related to provide a lapping of the lip over the shoulder on the top bar, the engaging edges of the shoulders having a camming relation progressively disengaging the shoulder on the overhanging lip from the slit edge of the top bar as the top bar is inclined.

6. In a wringer, the combination of a frame comprising hollow metal stiles, one of the stiles at least having a dual stabbing with a bridge portion between forming shoulders each side of the bridge; and a top bar having a downwardly extending end wall with dual stabbings with a bridge portion between forming shoulders each side of the bridge adapted to engage with the shoulders of the stile, the edges of the shoulders of the top bar and the stile being related to overlap vertically.

7. In a wringer, the combination of a frame comprising hollow metal stiles, one of the stiles at least having a dual stabbing with a bridge portion between forming shoulders each side of the bridge; and a top bar having a downwardly extending end wall with dual stabbings with a bridge portion between forming shoulders each side of the bridge adapted to engage with the shoulders of the stile, the edges of the shoulders of the top bar and the stile being related to overlap with the engaging edges having a camming relation progressively disengaging the overlapped edges as the top bar is inclined.

WALTER L. KAUFFMAN II.